Patented Aug. 12, 1924.

1,504,829

UNITED STATES PATENT OFFICE.

FRANCIS MULLIGAN, OF BELFAST, IRELAND.

PLASTER.

No Drawing.  Application filed February 6, 1924. Serial No. 691,032.

*To all whom it may concern:*

Be it known that I, FRANCIS MULLIGAN, of Belfast, Ireland, a subject of the King of Great Britain and Ireland, have invented certain new and useful Improvements Relating to Plaster, of which the following is a specification.

This invention relates to the manufacture of cement of the class in which burnt gypsum is mixed with a hardening agent.

In the manufacture of "Keene's" cement and similar cements of this class, very fine gypsum is calcined to a red heat, the gypsum and fuel being arranged in a kiln in alternate layers. After calcination, the dehydrated lime sulphate is immersed in an alum bath and the resulting product, when dried, burnt at a high temperature and finally ground to a fine powder.

The object of the present invention is to provide an improved hydraulic cement having greater strength than previously known cements of this class.

I have found that when raw gypsum is heated to a point of clinkering or fusing, which is only obtained at a high temperature ranging from 1800° F. to 2400° F. and this temperature is maintained for not less than 15 hours, large quantities of free lime is released which renders the material obtained hydraulic, the water in the gypsum being completely dried out. In this respect my invention differs from previously known methods of calcining gypsum which takes place at a much lower temperature, say 650° F., and the time occupied for calcination being 3 to 5 hours.

The cement obtained by my improved process will set under water and gives a high tensile strength (250 lbs. to the square inch at 7 days, and 500 lbs. to the square inch at 28 days), in other words a cement is obtained that sets under water as readily as in the air.

Accordingly, my invention consists in calcining raw gypsum as aforesaid, after calcination separating the gypsum from the fuel, and then grinding it into a fine powder, and finally, adding to this powder not more than one per cent of a solid hardening agent.

The raw gypsum and coal are burnt together in about the proportion of eight tons of gypsum to one ton of coal arranged in alternate layers in a kiln, the temperature of which ranges from 1800° F. to 2400° F. and is maintained at this temperature for about 15 hours. After calcination the gypsum is separated from the coal and ground to a fine powder, and to prevent heating of the gypsum during grinding, it is sprinkled with water or subjected to atmospheric moisture before grinding and finally, to the fine inactive lime or plaster thus obtained is added alum, borax, soda or potash to serve as a hardening agent. The hardening agent renders the lime or plaster active when slaked with water and it will remain active for a comparatively long period. The cement or plaster obtained by the process hereinbefore described has all its setting qualities removed by the process of manufacture and the setting qualities are recreated when the water leaves the material by the action of the atmosphere and the absorbent nature of the wall or board.

The hard plaster obtained according to my invention is easily applied. It gives a strong cement-like key, and a fine, hard, smooth glassy finish which, when dry, can be immediately painted on or coloured with distemper, or the like, or papered if desired, there being no active chemicals to injure the paint or paper.

The plaster will lie for hours on a plaster board and can be worked the same as ordinary Portland cement, but when applied to a dry wall, it sets hard with sufficient speed to allow the surface to be polished within an hour of its being applied to the wall.

The plaster as described can be used with sand if desired, as a primary coat, but for finishing coats it would be used by itself. A white ivory finish giving a white marble effect can be got by trowelling the plaster on a wall until it hardens.

Having now fully described my invention what I claim and desire to secure by Letters Patent is:—

1. A process of manufacturing cement of the kind described, consisting in first burning raw gypsum in the presence of fuel to a point of clinkering or fusing and maintaining it at this point for a period of 15 hours, after calcination separating the gypsum from the fuel then grinding it into a fine powder and finally adding not more than one per cent of a solid hardening agent to the powder.

2. A process of manufacturing cement of the kind described, consisting in first burning raw gypsum in the presence of fuel to a point of clinkering or fusing and maintaining it at this point for a period of 15 hours, after calcination separating the gypsum from the fuel, sprinkling the calcined gypsum with water, and then grinding it into a fine powder and finally adding not more than one per cent of a solid hardening agent to the powder.

3. A cement which is made by first burning raw gypsum in the presence of fuel to a point of clinkering or fusing and maintaining it at this point for a period of 15 hours, after calcination separating the gypsum from the fuel then grinding it into a fine powder and finally adding not more than one per cent of a solid hardening agent to the powder.

In testimony whereof I affix my signature in presence of two witnesses.

FRANCIS MULLIGAN.

Witnesses:
ANDREW HAMILTON,
HARRY WALTER ALLSOP.